(No Model.)
I. R. RITTER.
NUT LOCK.
No. 348,345. Patented Aug. 31, 1886.
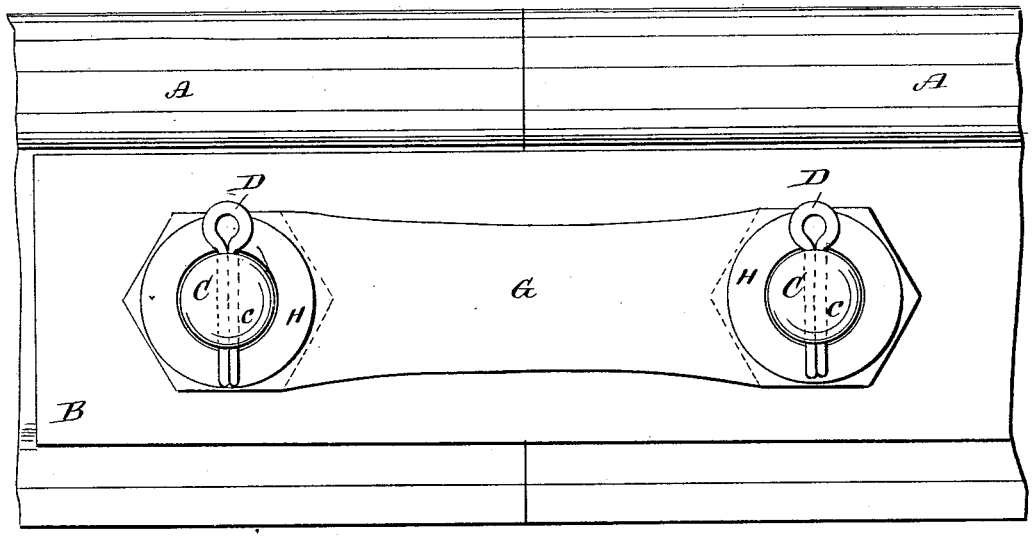
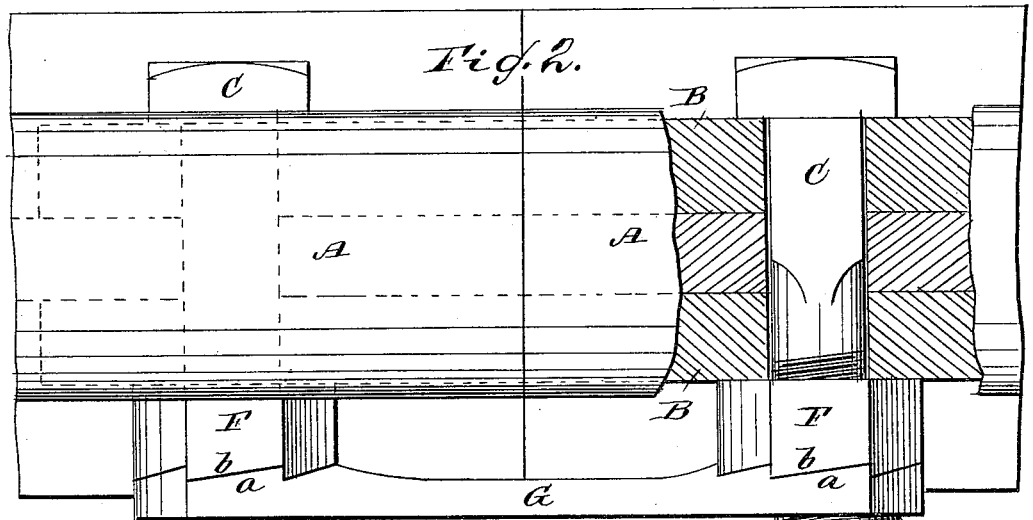
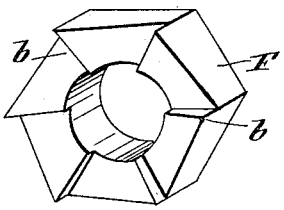
WITNESSES:
INVENTOR:
I. R. Ritter
BY Munn & Co.
ATTORNEYS.

UNITED STATES PATENT OFFICE.

ISAAC R. RITTER, OF READING, PENNSYLVANIA.

NUT-LOCK.

SPECIFICATION forming part of Letters Patent No. 348,345, dated August 31, 1886.

Application filed January 16, 1886. Serial No. 189,758. (No model.)

*To all whom it may concern:*

Be it known that I, ISAAC R. RITTER, of Reading, in the county of Berks and State of Pennsylvania, have invented a new and Improved Nut-Lock for Railway-Joints and other Purposes, of which the following is a full, clear, and exact description.

My invention relates to a new and improved nut-lock, designed for use on railway-joints and in other places, and the object of my invention is to devise practical means to prevent the loosening of the nuts upon the bolts; and the invention consists principally of the combination of notched nuts, of a notched retaining-plate, and springs arranged to lock the nuts upon the bolts.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a side elevation of a railway-joint having my invention applied thereto. Fig. 2 is a broken plan view of the same, and Fig. 3 is a perspective view of one of the nuts.

The rails A A, fish-plates B B, and bolts C C are of the usual form, except that the bolts are made somewhat longer than common, and each has an orifice, c, formed in it to receive a pin or spring-key, D, for holding the coiled spring E upon each of the bolts.

F represents the bolts for closing the fish-plates B firmly against the webs of the rails A. Owing to the spring and jar caused by passing railway-trains, the nuts F are subjected to a loosening action, or an action that is liable to turn them back upon the bolts, and to lock them against this danger of loosening I employ the locking-plate G and the said springs E, placed upon the bolts. The locking-plate G reaches from bolt to bolt, and is formed at its ends with eyes to fit over the bolts and about the eyes through which the bolts pass. The plate is notched upon its inner surface, as shown at $a\,a$, or otherwise formed to engage with the nuts. When the notches $a\,a$ are used, the outer faces of the nuts F will be correspondingly notched, as shown at $b$, to receive notches of the plate G, as shown clearly in Fig. 2. The notches $a\,b$ are inclined in opposite directions, like ratchet-teeth, so that the nuts F may be turned forward upon the bolts, but not backward. The springs E are held to press against the plate G by the pins D and the washers H, placed upon the bolts between the pins and the springs; but the washers may be omitted, if desired.

Although I have shown my invention applied to railway-joints, I do not limit myself to this use, as it is applicable in various situations on bridges, machinery, and other structures.

Having thus described my invention, what I claim as new, and desire to secure by Letters Patent, is—

1. The bolts C, and nuts F, and locking-plate G, reaching from bolt to bolt and engaging with the nuts, in combination with the springs E, held upon the bolts to press against the plate G, substantially as and for the purposes described.

2. The nut F, formed with inclined notches $b$, and placed on bolts C, in combination with the notched plate G and spring E, held to press against the nut, substantially as and for the purposes described.

3. The bolts C, formed with orifices $c$, and the nuts F, notched at their outer faces, in combination with the springs E, key D, and locking-plate G, formed with notches at its ends to engage with the notches of the nuts, and all arranged substantially as and for the purposes set forth.

ISAAC R. RITTER.

Witnesses:
M. M. BANKS,
WILLIAM P. BARD.